United States Patent
Lasiuk et al.

(10) Patent No.: US 7,480,363 B2
(45) Date of Patent: Jan. 20, 2009

(54) CONVERTING A DIGITAL RADIOGRAPH TO AN ABSOLUTE THICKNESS MAP

(75) Inventors: Brian W. Lasiuk, Spring, TX (US); Thomas J. Batzinger, Burnt Hills, NY (US); Manoharan Venugopal, Bangalore (IN); Elizabeth L. Dixon, Delanson, NY (US); Michael R. Hopple, Scotia, NY (US); Nityanand Gopalika, Bihar (IN); Sivaramanivas Ramaswamy, Bangalore Karnataka (IN); Debasish Mishra, Bangalore (IN); Rajashekar Venkatachalam, Bangalore (IN); Vamishi Krishna Reddy Kommareddy, Bangalore (IN)

(73) Assignee: GE Betz, Inc., Trevose, PA (US)

( * ) Notice: Subject to any disclaimer, the term of this patent is extended or adjusted under 35 U.S.C. 154(b) by 296 days.

(21) Appl. No.: 11/108,498

(22) Filed: Apr. 18, 2005

(65) Prior Publication Data

US 2006/0058974 A1    Mar. 16, 2006

Related U.S. Application Data

(60) Provisional application No. 60/609,934, filed on Sep. 15, 2004.

(51) Int. Cl.
*G01B 15/02* (2006.01)
(52) U.S. Cl. .............................. 378/54; 378/56; 378/58; 378/59
(58) Field of Classification Search .................. 378/51, 378/54, 56, 57, 58, 59, 207, 55
See application file for complete search history.

(56) References Cited

U.S. PATENT DOCUMENTS

| | | | | |
|---|---|---|---|---|
| 4,926,452 A | * | 5/1990 | Baker et al. | 378/22 |
| 4,928,257 A | * | 5/1990 | Yerkes et al. | 702/40 |
| 5,243,664 A | * | 9/1993 | Tuy | 382/130 |
| 5,335,260 A | * | 8/1994 | Arnold | 378/207 |
| 5,377,250 A | | 12/1994 | Hu | |
| 5,565,678 A | * | 10/1996 | Manian | 250/252.1 |
| 5,698,854 A | | 12/1997 | Gupta | |

(Continued)

FOREIGN PATENT DOCUMENTS

EP        1072861       1/2001

(Continued)

*Primary Examiner*—Allen C. Ho
(74) *Attorney, Agent, or Firm*—Wegman, Hessler & Vanderburg

(57) ABSTRACT

A digital radiography imaging system for acquiring digital images of an object, and a method for transforming digital images into an absolute thickness map characterizing the object under inspection. The system includes a radiation source for directing radiation through a desired region of the object, and a radiation detector having a plurality of sensing elements for detecting radiation passing through the object. Numerical data generated from each sensing element is calibrated, for example by correcting for variations in radiation paths between the source and detector, by correcting for variations in the spatial frequency response (MTF) of the detector, by correcting for variations in the geometric profile of the object under inspection, and by correcting for material contained in and/or around the object. The calibrated data is processed in order to generate and display an absolute thickness map of the object. The calibration procedures are adapted for extracting a thickness map from both isotope sources and X-ray tube sources.

23 Claims, 12 Drawing Sheets

U.S. PATENT DOCUMENTS

| | | | |
|---|---|---|---|
| 5,907,593 A | 5/1999 | Hsieh et al. | |
| 5,970,115 A * | 10/1999 | Colbeth et al. | 378/62 |
| 6,137,860 A * | 10/2000 | Ellegood et al. | 378/58 |
| 6,148,057 A * | 11/2000 | Urchuk et al. | 378/18 |
| 6,175,613 B1 * | 1/2001 | Boutenko et al. | 378/98.4 |
| 6,201,850 B1 | 3/2001 | Heumann | |
| 6,347,131 B1 * | 2/2002 | Gusterson | 378/54 |
| 6,377,654 B1 | 4/2002 | Williems et al. | |
| 6,410,921 B1 * | 6/2002 | Nakazawa | 250/370.09 |
| 6,459,754 B1 | 10/2002 | Besson et al. | |
| 6,521,886 B2 | 2/2003 | Aufrichtig et al. | |
| 6,570,955 B1 * | 5/2003 | Siffert et al. | 378/54 |
| 6,600,806 B1 * | 7/2003 | Istar | 378/59 |
| 6,614,874 B2 | 9/2003 | Avinash | |
| 6,618,464 B2 * | 9/2003 | Mizobuchi et al. | 378/55 |
| 6,628,744 B1 * | 9/2003 | Luhta et al. | 378/15 |
| 6,632,020 B2 * | 10/2003 | Kaufhold et al. | 378/207 |
| 6,872,949 B2 * | 3/2005 | Mizuoka et al. | 250/358.1 |

FOREIGN PATENT DOCUMENTS

| | | |
|---|---|---|
| JP | 05099806 | 4/1993 |
| JP | 62277542 | 2/1997 |
| JP | 2002162217 | 7/2002 |
| WO | WO 02061455 | 8/2002 |

* cited by examiner

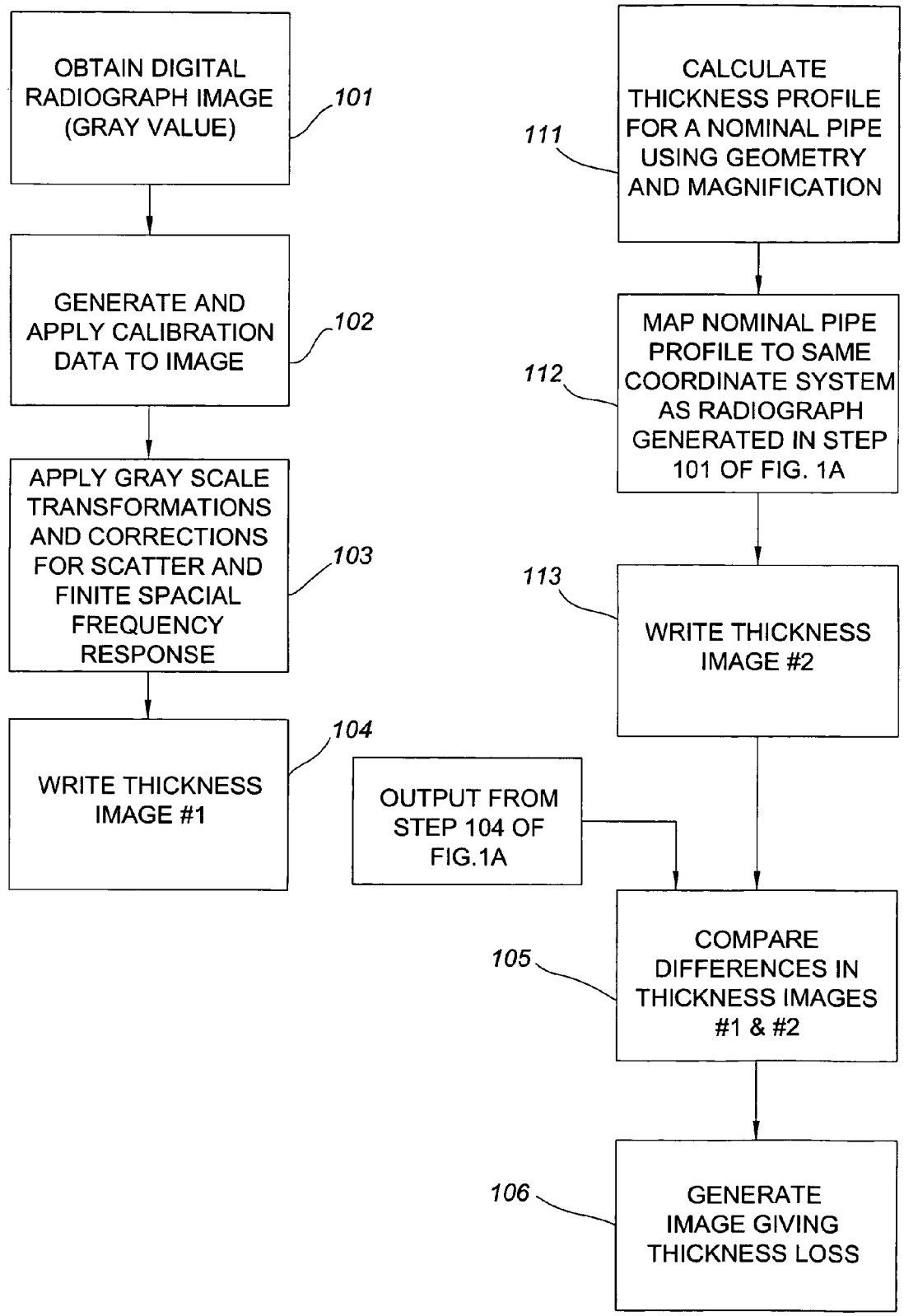

CONVERTING A DIGITAL RADIOGRAPH TO AN ABSOLUTE THICKNESS MAP

CROSS REFERENCE TO RELATED APPLICATION

This application claims the priority benefit of U.S. Provisional Patent Application Ser. No. 60/609,934 filed Sep. 15, 2004.

FIELD OF THE INVENTION

The present invention relates generally to radiographic imaging systems, and more particularly to methods and algorithms for characterizing the condition of containment vessels and fluid transport piping installations in a quantitative (and qualitative) fashion over large areas. Specifically, the algorithms and methods of the present invention are used to convert a digital measure of a transmitted X-ray spectrum to an absolute measure of material thickness with high accuracy and precision. The imaging system developed in accordance with the present invention is adapted to deliver an X-ray source and detector to a pipe or vessel installation in a well defined geometrical relation, without using the pipework itself as a support structure.

BACKGROUND OF THE INVENTION

Most industrial complexes utilize piping and containment vessels to transport and deliver fuel, water, and other necessary solid and fluidic chemical materials. In installations, such as oil and gas fields, power stations, petrochemical plants, etc., the fluids and the environments in which they reside can be quite hostile. High temperatures and pressures exist in the presence of volatile, toxic, and corrosive chemical mixtures. As these substances are transported throughout a plant, they can cause both mechanical as well as chemical degradation of the piping and vessel infrastructure. The damage is seen in terms of physical material loss due to corrosion and erosion or a weakening of the infrastructure due to increased stress. Processes which cause material loss, degrade the structural and mechanical integrity of plants. In order to ensure safe and reliable operating conditions, such plants and facilities must be continuously inspected and monitored.

The key to maintaining reliability of an operating industrial complex is to develop and implement a regularly scheduled maintenance program. Minimal requirements that define basic safe operating procedures for maintenance and inspection are legislated in most areas of the world. However, these standards are not aimed at maintaining peak operating efficiency of the plant, nor are they specified to ensure maximal up-time for plant operations. Plant efficiency and up-time are important considerations in establishing a maintenance plan as there is a direct link to commercial profitability. Optimization of a maintenance plan requires the acquisition and detailed analysis of a multitude of both qualitative and quantitative data. The analysis is done to facilitate an assessment of the condition of the plant infrastructure and determine the fitness for service of specific components, vessels, pipes, etc. Once an evaluation is made, necessary adjustments can be made to the operating conditions of the plant and/or corrosion prevention program.

The cost and quality of the decisions is primarily driven by the precision, accuracy, and completeness of the measurements in the inspection. The better the precision and accuracy of the measurement, the better one can assess the condition, and predict if and when a failure will occur. The more complete the inspection information is, the more certain the conclusions will be since less reliance must be made on extrapolation and estimation. However, a fully condition-based maintenance program is difficult to deploy owing to the lack of availability of a complete quantitative survey of asset conditions. Furthermore many of the different inspection and monitoring modalities utilized in evaluating the fitness for service of a plant are unable to give a quantitative assessment of condition over large areas.

Digital imaging systems are becoming increasingly widespread for producing digital data that can be reconstructed into useful radiographic images. An exemplary system is described in our prior U.S. application Ser. No. 10/646,279, filed Aug. 22, 2003, now U.S. Pat. No. 6,925,145, the disclosure of which is hereby incorporated by reference herein. In addition, ultrasound (UT) technology gives very accurate measurements of material (i.e., wall) thickness. However, UT technology is in general limited to measurements over areas of point like dimensions. While this is sufficient for uniform general corrosion, localized corrosion and damage mechanisms that can produce such features as deep narrow pits and steep gradients of material erosion, are difficult to detect and measure accurately without the use of an imaging based modality. This is becoming less of an issue with the introduction of phased array ultrasound which allows UT data to be acquired over a more extended area. However, this fundamental technique is still a contact modality and is thus restricted to materials, and conditions, that support transmission of acoustic energy. UT measurements are sometimes difficult to deploy since a good acoustic coupling must be made between the transducer and the material under inspection. As such, any thermal insulation that is present on piping or vessels must be removed, or an inspection port need be installed so that direct access to the surface is available. Furthermore, piping that is insulated is quite often at an elevated temperature, and UT sensors may not be able to function efficiently under such conditions. Another problem with acoustic inspection methods is that multiple measurements must be made of the identical region over an extended period of time in order to track the evolution of these defects. These measurements have significant compromises in the ultimate precision that can be attained, and such measurements cannot be made in real-time in order to correlate with plant operating conditions. In many cases a non-contact modality, like radiography, is used to screen for regions where more detailed wall thickness information is required.

Other long term monitoring techniques, for example coupon evaluation, are known to provide information over a larger portion of a plant. However it is almost impossible to correlate coupons with specific plant operating conditions in real-time or to identify small regions of enhanced or accelerated corrosive activity. This technique is sensitive to conditions which are generally integrated over long time scales, and large areas. Specific information about small areas are not monitored well with this technique. Furthermore, unlike the other non-destructive testing (NDT) methods, installation and extraction of a coupon is an intrusive measurement.

Film based radiography systems suffer from a different problem. Although the raw data captured in a radiograph gives information over an extended area, it has been very difficult to extract quantitative information from the gray scale shading or rendering from a piece of film. Furthermore, the small dynamic range of film means that wide variations in material thickness cannot be imaged effectively in single exposures. The technique utilized in extracting a material thickness is to compare it with a calibrated shim or wedge of material of well-defined thickness. The general use of radiography has been to utilize its property of being a non-contract image based measurement to identify locations where features or defects exist. Since radiography is sensitive to the total path integral of the material between the source of radiation and the detector plate, the different contrasts and shading are used to extract qualitative information regarding such features and defects in the radiograph; that is, a lack of fusion in weld, or cracks show up as a variation in the gray shading. Quantification of this effect is very difficult. If a feature or defect is identified, the location is usually measured with an alternate modality, such as ultra-sound, to extract a true quantitative measurement.

While the quantitative behavior of the gray-scale is typically difficult to interpret, the dimensioning capability of measuring the spatial extent of a feature is quite easy because radiography is image based. As such, the size and dimension of a feature in the plane of the image can be easily deduced by comparing the feature to a reference object of known dimension. The precision of such a measurement is determined by the spatial resolution of the detector (i.e., film, imaging plate, detector, etc.), and the knowledge of the geometry of the source, object and film orientation. This is the fundamental principle behind the extraction of wall measurement thicknesses with the technique of profile or tangental radiography (radioscopy). In this technique, the wall thickness is surmised by taking a radiographic exposure tangental to the pipe, or vessel. A profile of the wall thickness is imaged and delimited by a contrast difference in the radiograph, which can be used to dimension the wall thickness. A simple correction is made for the shot magnification as defined by the relative distances between the X-ray source and detector, and the X-ray source and object under inspection. Correction by this factor allows the dimensioning of an object in absolute units to a high precision. Unfortunately this technique is restricted to extracting the wall thickness at the position perpendicular to the tangent of the pipe, and a complete series of shots need be taken to cover the complete area of the pipe, for example as described in U.S. Pat. No. 6,377,654.

The advent of digital technology has significantly increased the capabilities of radiography, although the fundamental technique of transmission radiography has not changed—that is, an X-ray radiation source illuminates an object under inspection. Typically, a radiation detector is placed behind the object so that it measures the X-ray spectrum transmitted through the object. The intensity of the transmitted spectrum is modulated by the material structure and density. The degree of intensity variation on the detector, or contrast variations, can be used to extract information about the material structure and integrity. With film radiography, the interpretation is generally qualitative. However, digital detectors provide a discrete numerical value that gives a measure of the transmitted X-ray flux on each individual sensing element, or pixel. This numerical value is proportional to the number of photons transmitted through the material under inspection and incident on the detector. The size and shape of the detector pixels, or sensing elements are a significant geometrical parameter, which along with the response of the detector components (i.e., material, electronics, etc.) determine the spatial resolution and sensitivity of the detector. This determines the minimum size of a feature that can be resolved. The discrete numerical value of the transmitted X-ray flux can then be mapped to a gray scale so that the image can be displayed in a manner similar to its film based renderings. As with film-based radiography, details of the structure of the object as well as dimensions of features can be determined, in similar manners; that is, by comparison to standard objects with known dimension. However, given access to the discrete numerical data of a digital image, procedures and algorithms can be automated to improve the speed, accuracy, and convenience of the measurements. These algorithms utilize well-known automated threshold detection and filtering algorithms to detect the spatial extent of features by quantifying the regions of contrast change within the radiograph.

Others have utilized digital radiography (DR) technology to compare a numerical gray scale value over a line or profile to a gray scale produced by a calibrated shim or wedge of known thickness. Such methods allow one to estimate the value of a material thickness. However the precision and accuracy of such a procedure is compromised in all but the most simple cases where the impulse (or thin material) approximation is valid. Many have taken the path of developing and patenting digital analogs of older methods, such as edge detection to facilitate automated dimensioning and tangental radiography, for example as disclosed in U.S. Pat. No. 6,377,654. However, limitations still exist in the application of radiography to extract precision absolute measurements on thicknesses over large areas.

Thus, there exists a strong need to develop a method for quantitatively transforming a complete radiographic image into an image representing the absolute thickness measurement, i.e., thickness map, of the material.

SUMMARY OF THE INVENTION

A digital radiography imaging system for acquiring digital images of a physical structure, and a method for transforming digital images into an absolute thickness map characterizing the object under inspection. The imaging system includes an X-ray source for directing X-rays through a desired region of the structure and an X-ray detector having a plurality of sensing elements for detecting X-rays passing through the structure. Numerical data generated from each sensing element is calibrated, for example by correcting for variations in X-ray paths between the source and detector, by correcting for variations in the spatial frequency response i.e. modulation transfer function (MTF) of the detector, by correcting for variations in the geometric profile of the object under inspection, and by correcting for material contained in and/or around the object. The calibrated data is processed so as to generate and display an absolute thickness map of the object. The calibration procedure is adapted for extracting a thickness map from both isotope sources and X-ray tube sources.

BRIEF DESCRIPTION OF THE DRAWINGS

FIG. 1A is a flow diagram describing a procedure for generating a thickness image from a gray scale image in accordance with an embodiment of the invention.

FIG. 1B is a flow diagram describing a procedure for generating a reference thickness map, and comparing same to acquired thickness image of FIG. 1A.

DETAILED DESCRIPTION OF EXEMPLARY EMBODIMENTS

Figure 2A:
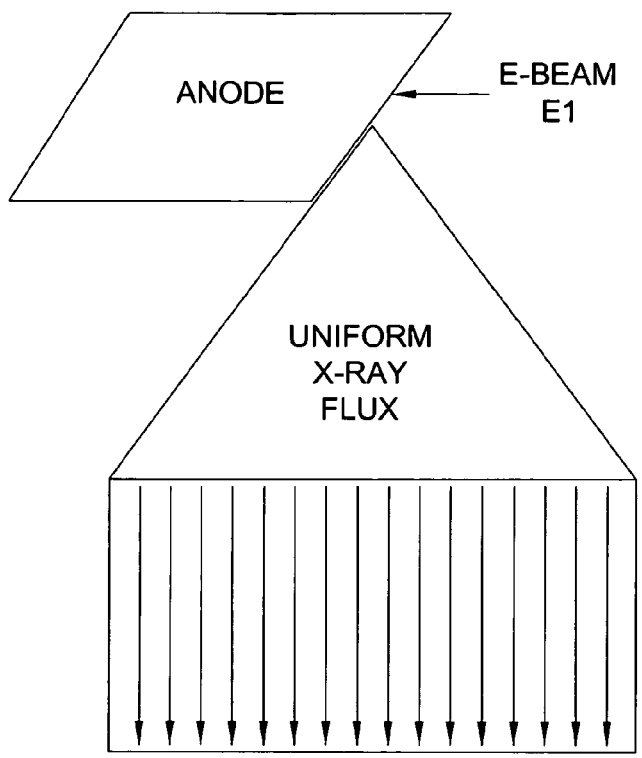
FIGS. 2A and 2B illustrate how the heel effect creates a variation in measured intensity across the beam cone when comparing different energies (E1 and E2, where E1<E2) of air images, where the amount of filtering of the X-ray beam fan through the anode depends on the energy of the e-beam.

The exemplary embodiments of the present invention will be described below with reference to the accompanying drawings. In the following description, well known functions or constructions are not described in detail to avoid obscuring the invention in unnecessary detail.

The motivation for the invention is to utilize radiography for quantitative inspection purposes, rather than its primary use as a qualitative screening tool. Instead of using radiography as a screening tool that serves to identify features or defects, our aim is to use radiography as a primary inspection modality that is capable of estimating wall thicknesses at a level competitive with state of the art ultra-sound technology. If the level of absolute precision in the radiographic measurement is 2-10%, radiography has the potential of yielding more complete information during an inspection because it is an image-based modality which can cover a large area. However, in order to realize the prescribed precision, a detailed procedure involving calibration and corrections procedures must be implemented. The following paragraphs detail the methodology and claims put forward in the disclosure.

Referring now to FIGS. 1A and 1B, there is shown a pair of flow charts summarizing improved methods for generating a thickness map in accordance with the present invention. It is important to note that although the invention will be described with reference to acquiring a thickness map of hollow pipeline objects, it is understood that the invention is also applicable to many other types of objects, and that many other measurable parameters of such physical objects could also be mapped without departing from the broader scope of the present invention.

Referring to FIG. 1A, in step 101, a digital radiograph image of the pipe or other object under inspection is obtained after the detector response has been calibrated with a flat field image. The flat field image produces the individual channel (i.e. pixel) gain values. In step 102, calibration data, which measures the digital detector response to a series of well known thicknesses is acquired. The calibration data is then applied to the raw ADC map utilizing a non-linear interpolation and extrapolation algorithm. In step 103, corrections are applied to the raw calibration which includes scattering effects, undercut, geometry, finite spatial frequency response, etc. to generate a thickness calculation. In step 104, the thickness of the pipe or object under inspection is calculated and put in a format that allows rendering on a display.

FIG. 1B shows a procedure where the thickness map can be compared to a nominal reference object. The reference image can be calculated analytically, or acquired from a sample pipe. The initial step 111 generates a thickness profile from a reference pipe (i.e. object) given specific geometry, magnification parameters. In step 112, the reference object is aligned with the actual inspection object as rendered in step 104. In step 113, a comparison of the thickness on a pixel-by-pixel basis can then be made. This is done in step 105. In the final step 106, an image (color coded or otherwise) can be generated with such that a view of the defects can be enhanced.

In order to extract an absolute thickness measurement from a radiograph, a flat field image must first be acquired. A flat field image is an image where the response of each individual pixel (i.e., the number of counts registered by the electronics of the channel) when exposed to a radiation source, is uniform throughout the area of the detector panel. In an exemplary detector panel, for example our GE DXR 250RT detector panel, the exceptionally low noise electronics yields a variation from a mean value of less than 0.5%. Although it is obviously desirable to attain as low a variation in the signal as possible, this technique is not limited to such low noise detectors.

In order to measure a flat field image, an offset (i.e., null) image must be acquired. The offset image is used to establish the detector response to a null or zero intensity X-ray spectrum. Thus, any signal that is registered in the detector is due to extraneous sources, most notably due to dark or leakage currents in a digital detector. This is the intrinsic response to the detector merely being powered. This offset value must be subtracted from any image taken when the detector is exposed to radiation so that a true measure of any radiation can be separated from the intrinsic properties of the detector.

Once this offset image is established, the detector can be exposed to a radiation dose, with no object attenuating the beam between the source and detector. It is known that the source should be fixed with respect to the detector in such a way that the line defining the minimum distance between the source and detector falls at the centroid of the detector. Independent of whether the radiation source is an X-ray tube, or radioisotope emitting X-ray or gamma radiation, the response of the detector should produce a maximum signal (i.e., maximum number of counts) at the point intersection the shortest line from the source to detector. The response or count level should fall off in a radial pattern in the detector consistent with an inverse square law reflecting the source to detector distance. As such, the pixel value counts will fall off as one moves out from the center of the detector panel. Using the ratio of the pixel values with respect to the maximal pixel value at the center of the detector, one can calculate a relative gain value for each pixel. The inverse of this gain value can be used to multiplicatively scale the response of each pixel in order to equalize the response of each pixel to incident radiation.

Figure 2B:
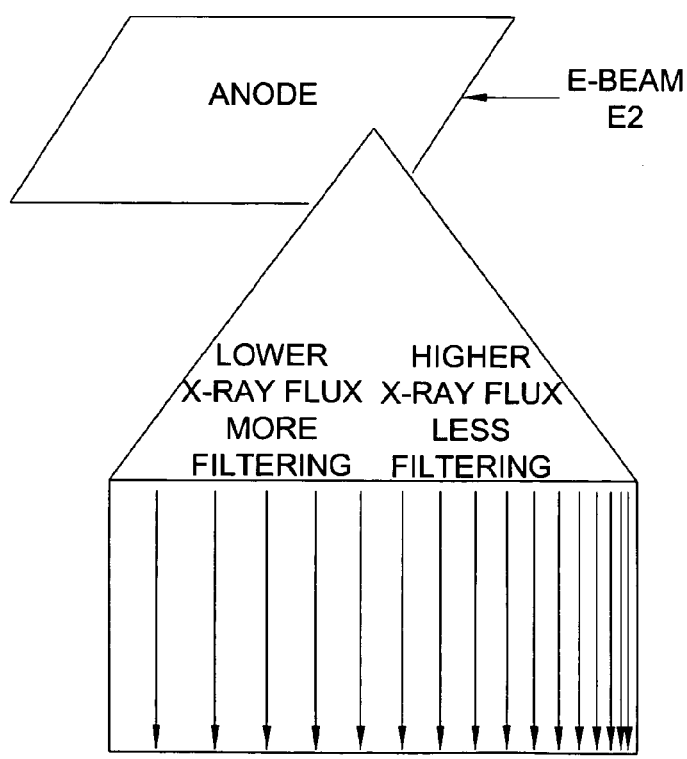

While this is a self-contained procedure for radiation from an isotope, there are complicated factors which occur for radiation generated from an X-ray tube. With reference to FIG. 2, an X-ray tube produces radiation by accelerating an electron beam produced at a cathode to a specific energy and depositing the beam into an anode, which is cut at an angle. The specific energy defines the "end-point" energy of the emitted EM spectrum. In FIG. 2A, the energy is E1. In FIG. 2B, the energy is E2. For this illustration, E1 is less than E2. Usually this anode is made of tungsten as it is a highly efficient stopping material and its high melting point allows large electron beam currents to be used. Electromagnetic (EM) radiation is produced in bremmstrahlung ("braking") processes, where electrons are decelerated and stopped in material. A continuous spectrum of radiation is produced containing all the energies from zero, all the way up to the energy of the electron beam, the end-point energy.

Due to the fact that radiation is absorbed in different fractions as a function of energy, further corrections must be made for tube-based radiation to account for the spectral composition. Since the anode is cut at an angle, the resultant EM is emitted in a cone beam perpendicular to the direction of the electron beam. Because of the construction of the anode, there is a spectral difference in the EM radiation profile as a function of position in the cone. The part of the cone that is emitted on the open side of the anode does not have to pass through as much anode material and is therefore attenuated less than the part of the spectrum that must pass through a significant thickness of material at the anode. Such differential filtration due to the varying path length of the material through which the EM radiation passes is responsible for the position dependence of the spectral contribution in the emitted EM cone. If a detector has even a slight proportional response to the energy of the radiation, this energy dependence in the beam will show up as an increasing number of counts across the detector. The rate at which this change in counts occurs across the detector is strictly a function of the X-ray tube (i.e., anode angle) and the end-point energy of the X-ray spectrum.

Referring again to FIGS. 2A and 2B, the amount of penetration of the e-beam into the X-ray tube anode depends on the energy of the beam. As shown in FIG. 2B, the e-beam penetrates into the anode. The higher the energy, the more penetration. As the penetration increases, the amount of filtering across the beam fan changes. That is, the side of the beam fan that is closest to the open side of the anode has less filtering (i.e., it does not have to traverse the material in the anode), and therefore more flux. As such, the profile of a flat field image changes depending on the energy of the beam. While the same noise level is seen in the detector at a different X-ray tube energy, a systematic rise is seen across the detector. This is due to the difference in X-ray spectral shape due to the shape of the X-ray anode. This change in spectral shape is known as the heel effect. In order to maintain control of the error on the extracted thickness, the variation in gray scale must be removed. This can be done in two fashions: 1) acquire the flat field image at the same energy that the radiograph of the object to be inspected will be acquired, or 2) remove the systematic variation of the detector gray scale count with a calibration curve. This can be directly measured or parameterized to correct for the effect, and produce a true flat field image.

Accordingly, the gain factors required to produce a flat field image must be determined for each particular tube and for each particular end-point energy used. The change in counts across the detector as a function of end-point energy can not only be parameterized as a simple linear function, but can be determined analytically given the anode angle, a property of the X-ray tube, and the cone angle of the emitted X-ray spectrum. This eliminates the need to acquire a "flat field calibration spectrum" for every single end-point energy that is used. It is noteworthy that without correction of this effect, a non uniform response to a specific thickness will be seen across the area of the detector. Once a nominal flat field image is acquired, a calibration from a known thickness of material can be acquired, as described below.

Figure 3:
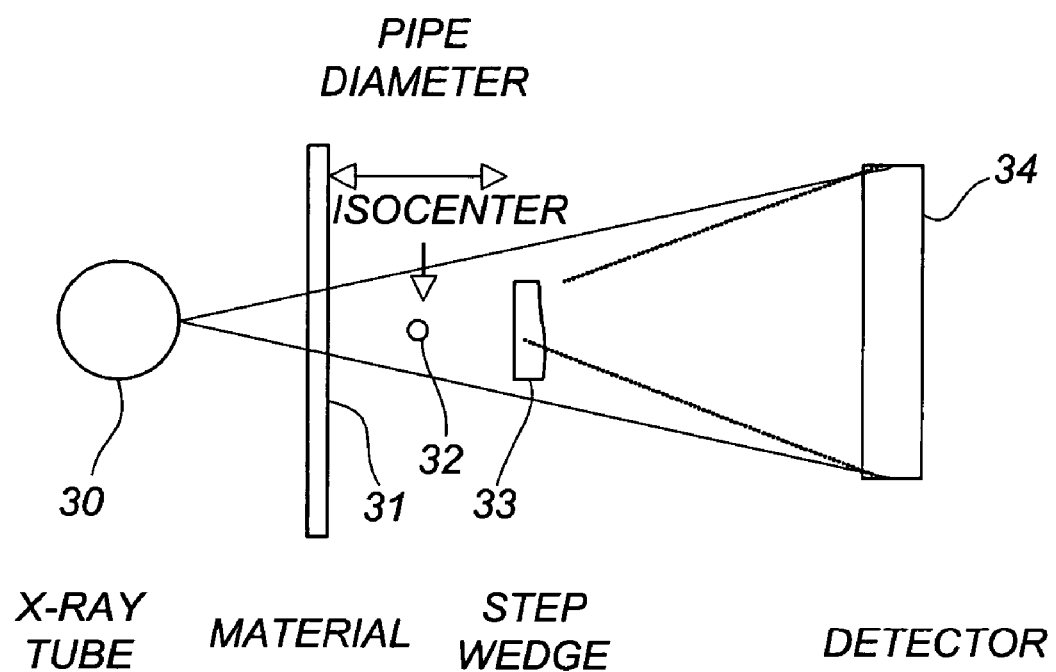
FIG. 3 illustrates a set up configuration to model the scattering profile from a double-walled object.

As shown in FIG. 3, a step wedge 33, or series of shims with known material thickness are placed at a nominal position between the source 30 and detector 34, although in an exemplary embodiment the geometry chosen will mimic similar geometry of the pipe or vessel placement. The step wedge models a variation in thickness for the back wall, while the material 31 nearest the X-ray tube is placed there to model the front wall. The detector response is measured as a function of the magnification of the object, which is calculated at the system iso-center 32. If the geometry is identical between the calibration set-up and the actual imaging geometry, no correction for the effect of the beam scatter will be necessary, as it is accurately parameterized into the thickness map. The correction for scattered radiation will be discussed later. If the shims do not project a shadow on the detector that covers the complete detector area, it is necessary to shield or mask the areas of the detector that will be exposed to the un-attenuated beam. This is necessary because at sharp material boundaries, scattering effects of the EM radiation scatter as well as inter-element scatter and under-cutting will reduce the effect of the transition due to strong scatter from the object and back-scatter from the detector volume. As such, the material thickness near the edge of the objects will appear to transmit more radiation than regions away from the edge. If this effect is not dealt with, an inappropriate correlation between the transmitted radiation, registered by the detector pixels will be made with the material thickness. While this correlation can be made experimentally, this effect can also be analytically calculated knowing the type of material being investigated, the distances between the source, detector, and object, and the geometry of the object. As with the flat field image acquisition, the procedure is slightly more complicated when utilizing an X-ray tube rather than an isotope because of the necessity to convolute the numerous spectral energies and the fact that the absorption and scattering cross section (i.e., probability) depend on the EM energy.

Scatter and Magnification

As mentioned above, a method for the correction of scattered radiation will now be described. It is to be noted that although this method was used at a specific magnification, it can be generalized to be applicable at any arbitrary magnification. As the magnification is changed, the total integrated amount of scattered X-ray radiation that is within the detector acceptance will change with respect to the total amount of primary (i.e., unscattered) radiation.

In order to generalize this procedure for use at arbitrary magnification, the ratio of primary to scattered radiation must be determined as a function of magnification. This will allow a single calibration radiograph to be scaled for the appropriate geometrical shooting conditions. Otherwise, a calibration image at the appropriate magnification must be taken for each specific magnification used.

The amount of scattered radiation that is within the acceptance of the detector will greatly alter the value of the gray scale that the detector reports. Scattered radiation results when X-rays are not fully absorbed in the material, and scatter with atomic electrons. At energies relevant to us, this is known as Compton scattering. This scattering process changes the trajectory of the photons. Those skilled in the art appreciate that this is an important consideration in imaging systems as it has the effect of increasing the size of the source, which decreases the sharpness of any edges and boundaries. It is known that the differential scattering cross-section (i.e., scattering probability) for photon scattering through an angle $\Theta$ (FIG. 4C) due to Compton-like processes is given by a formula known as the Klein-Nishima formula:

$$\frac{d\sigma}{d\Omega} = Zr_0^2 \left(\frac{1}{1+\alpha(1-\cos\theta)}\right)^2 \left(\frac{1+\cos^2\theta}{2}\right) \left(1 + \frac{\alpha^2(1-\cos\theta)^2}{(1+\cos^2\theta)[1+\alpha(1-\cos\theta)]}\right)$$

where Z is the atomic number of the scattering center, $r_0$, is the classical electron radius, and $\alpha$ is $E_o/m_e c^2$, where $E_o$ is the energy of the incident photon, and $m_e$ is the mass of the electron, and c is the speed of light. The Klein-Nishima formula enables us to calculate the fraction of photons that are scattered into a solid angle ($d\Omega = r^2 \sin\theta \, d\theta \, d\phi$) given the photon energy. Given an initial and final energy, the scattering angle $\Theta$ and probability of scattering can be determined.

The highest probability scattering is for the photons to only slightly change direction, i.e., small angle scatter ($\Theta$). The probability decreases as the size of the angular scatter increases.

Figure 4A:
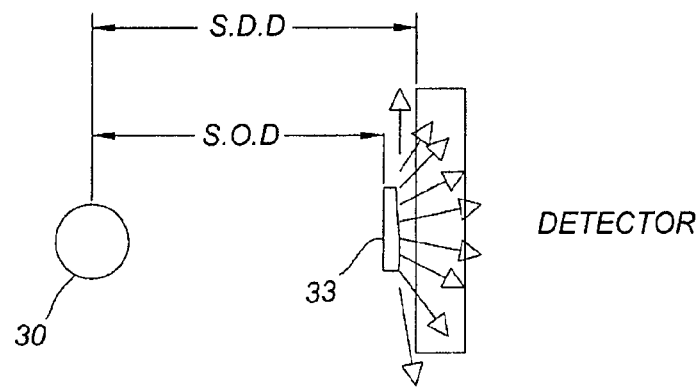
FIG. 4A illustrates the higher flux of photons accepted by the detector under lower geometric magnification, where Magnification=SDD/SOD. Photons in the full forward hemisphere are accepted.
Figure 4B:
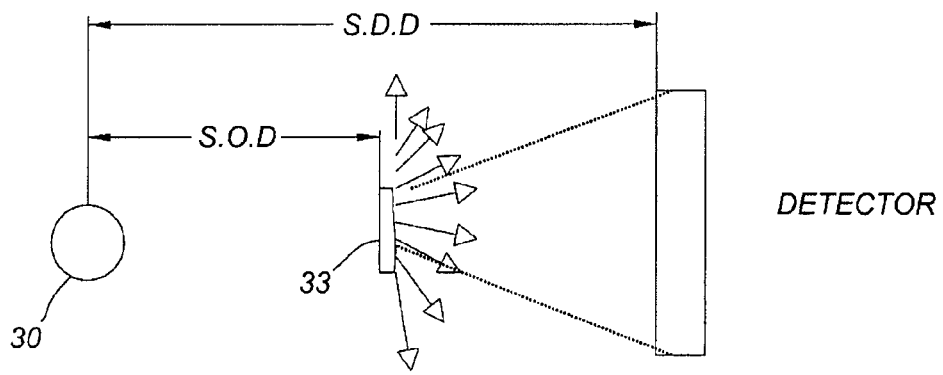
FIG. 4B illustrates the lower flux of photons accepted by the detector under higher geometric magnification, where Magnification=SDD/SOD. Photons in a subset of the forward hemisphere are accepted.
Figure 4C:
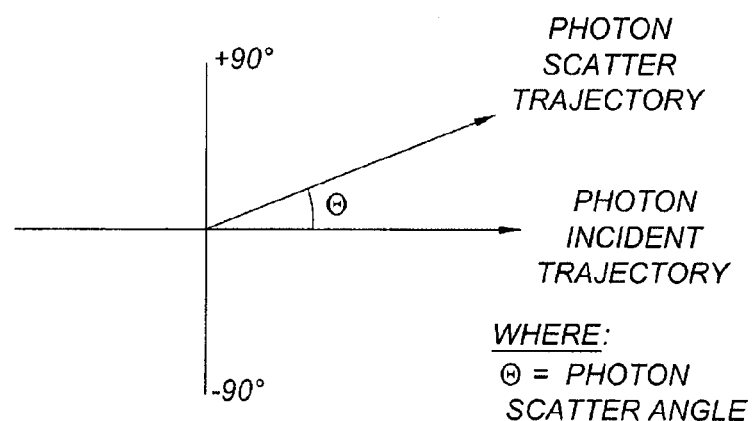
FIG. 4C illustrates the scatter angle of a photon from its incident trajectory. The region −90° to +90° defines the full forward hemisphere.

Magnification of the object is defined as the ratio of source-detector distance (SDD) divided by the source-object distance (SOD). In other words, Magnification=SDD/SOD. For a shooting geometry with a magnification of unity (i.e., SDD=SOD), the object is in an orientation directly in front of the detector. As such, any photon that scatters within the forward cone ($\pm 90°$ from the incident normal) will register in the detector (see FIGS. 4A, 4B and 4C). As best shown in FIG. 4B, as the geometric magnification increases, i.e., as the source-object distance (SOD) decreases with respect to the source-detector distance (SDD), the fraction of scattered radiation that intersects the detector is reduced. FIG. 4A illustrates lower magnification, and FIG. 4B illustrates higher magnification. That is, the geometric acceptance of the scattered radiation decreases as magnification increases as shown in FIG. 4B.

The physical effect of this is that the amount of radiation that the detector measures, which is proportional to the gray scale, will decrease as the geometric magnification increases. The detector response, or measured gray scale, decreases as the geometric magnification of shooting parameters increases. As described above, this can be explained by the fact that the detector subtends a smaller solid angle of the X-ray field emanating from the object, as seen in FIG. 4B. Referring again to FIG. 4B, as the magnification increases, a smaller fraction of the geometric acceptance is covered, which reduces the measured gray scale value.

This was parameterized in two different distinct methods.

The first was an effective calibration where we would measure the detector response with a step wedge shielded by an appropriate amount of material, in order to mimic the object under inspection. In our application this is specifically done to model a pipe geometry with a double-walled object.

Referring again to FIG. 3, there is illustrated a set-up to model the X-ray scattering profile from a double walled object, specifically a pipe, and extract a meaningful correlation with a calibrated step wedge. The step wedge models a variation in thickness for the back wall, while the material nearest the X-ray tube is placed there to model the front wall. The detector response is measured as a function of the magnification of the object, which is calculated at the system iso-center.

The Step wedge models a variation in thickness for the back wall, while the material nearest the X-ray tube is placed there to model the front wall. The detector response is measured as a function of the magnification of the object, which is calculated as the system iso-center. A parameterization of the gray scale (GS) is done for each step thickness (t) as a function of magnification (M). In this specific case, a functional form, sometimes referred to as the "logistic" model is used, as seen in equation 2, where a(t) is the gray scale as a function of thickness at a fixed magnification, and b is a constant dependent on the material and SDD.

$$GS = \frac{a(t)}{1 - e^{-bM}} \quad \text{(eqn 2)}$$

Figure 5:
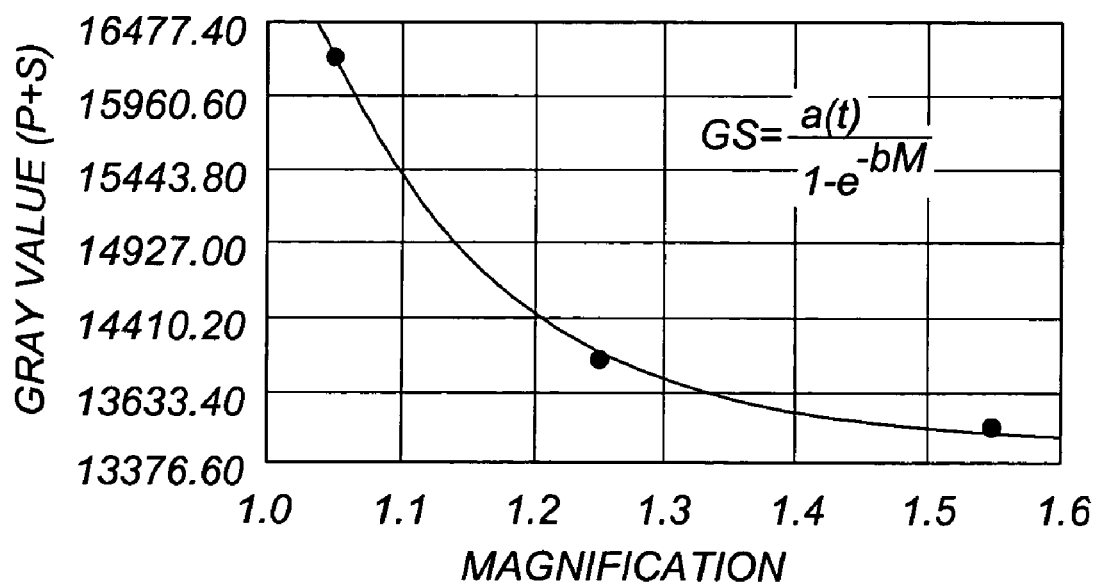
FIG. 5 is a graph illustrating a gray scale translation as a function of magnification.

FIG. 5 is a graph illustrating the gray scale value of fixed thickness as a function of magnification for the geometry of FIG. 3. In the limit, as the magnification tends to infinity, the gray-scale of a given thickness (t) approaches the asymptotic limit a(t). This corresponds to the smallest amount of scattered radiation measured by the detector (i.e., smallest acceptance cone). A family of such curves for different thicknesses can be generated to give a two-dimensional surface, which provides a gray scale translation to material thickness as a function of magnification. This method allows an estimate of the effect of scatter for different geometries.

An alternate method which does not rely on effective calibration methods has also been used. In this method, the fraction of scattered radiation in the forward cone is calculated according to the Klein-Nishima formula. In order to do this calculation, the geometric set-up is required, for example, source-detector distance (SDD) and source-object distance (SOD), as well as the dimensions of the detector. Using this information, the geometry of the acceptance cone of the detector can be determined from a completely analytical perspective.

Using this cone, the fraction of scattered radiation that falls within this region can be analytically calculated from the Klein-Nishima formula to determine the fraction of radiation that falls within the acceptance cone. For a mono-energetic X-ray energy this is a single calculation. For an X-ray spectrum, all relevant X-ray energies must be taken into account, weighting each energy by the photon fluence.

For a completely mono-energetic source, which is the case for some radio-isotopes, such as Cs-137, a straight-forward correlation can be made between the material thickness and the number of counts registered by a detector pixel. This will be very close to the functional form given by the Lambert-Beer law which states that in the thin material approximation, the number of transmitted photons decreases in number from the original un-attenuated flux, scaled by the exponential of a quantity defined by the product of negative one, times the attenuation coefficient, times the material path length. Complications to this elementary formula for mono-energetic sources occur for thicknesses beyond the order of several 100 mils, where the thin materials approximation does not hold because of the high probability of multiple interactions.

Moreover, the EM radiation cannot only be absorbed, but it can scatter as well. While the scaling of the Lambert-Beer law by the well known build-up factor can parameterize some of these interactions, the effect of scatter can either be modeled by Monte Carlo simulation or measured experimentally.

In order to describe the behavior with the spectrum produced from an X-ray tube, the spectral energy dependencies must be folded into these calculations. This is necessary because the attenuation coefficient is a function of the photon energy, and the spectrum is not uniformly attenuated by a specific material thickness. This effect is called beam hardening since the low energy spectral contributions are absorbed to a higher degree than the high-energy components. This produces a higher mean spectral energy, or harder spectrum. This beam hardening can be dealt with by allowing for a multi-component exponential parameterization of the thickness to detector response correlation. By measuring the degree of X-ray absorption for a wide range of material thicknesses, a multi-component exponential fit can be used to fit the data and parameterize the beam hardening. It is also possible to use a spline or semi-log interpolation to approximate the effect of a multi-component exponential behavior.

This concludes the procedure to generate the calibration data. A procedure for automating the correlation of the gray scale of the radiography with the thickness of the material will now be described.

Figure 6A:
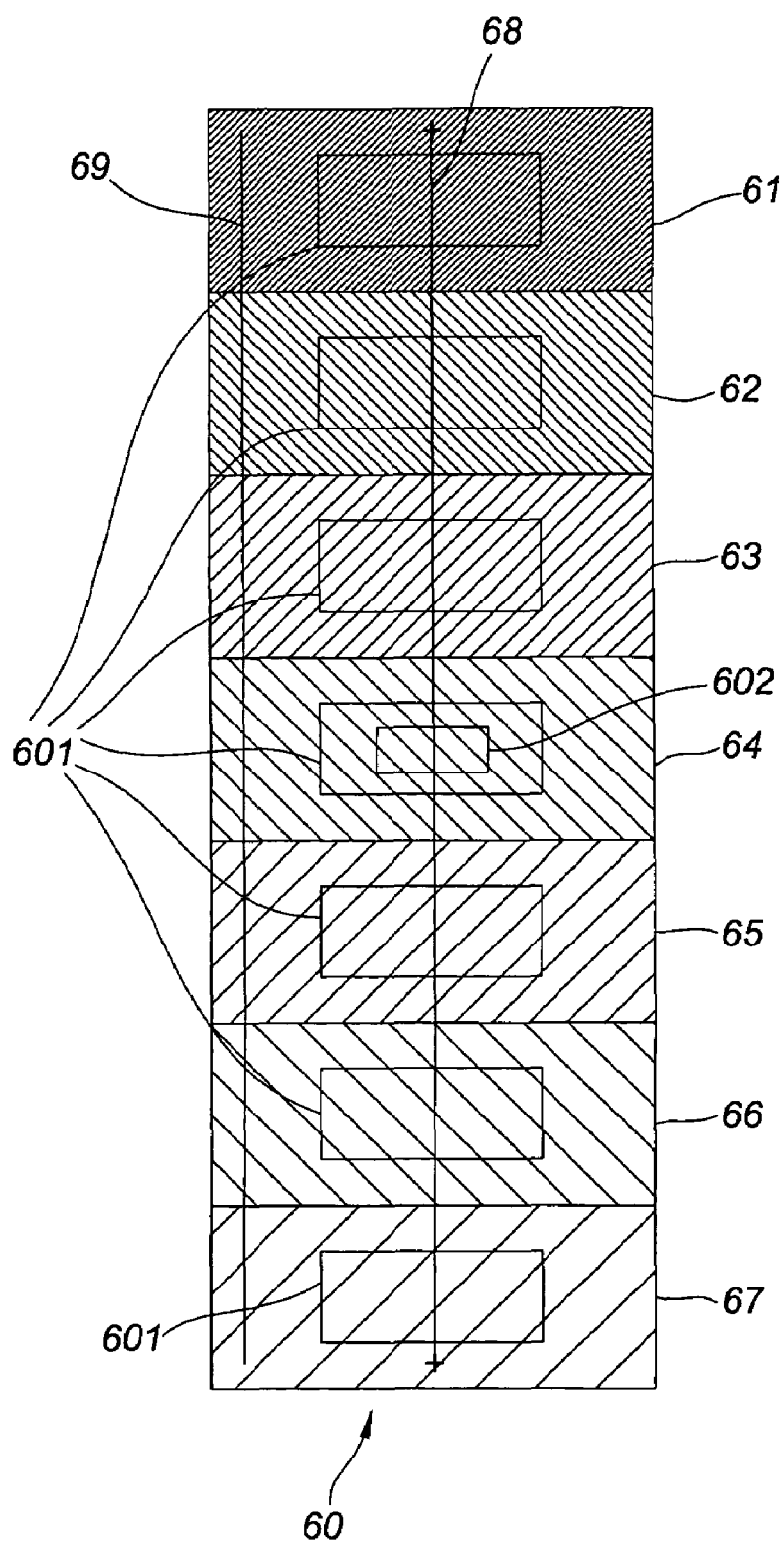
FIG. 6A illustrates a center-line-path overlaid on the gray scale image of a step wedge.

Referring to FIG. 6A, an image 60 of an object with several discrete thickness regions 61-67 (i.e., steps of a step wedge) is acquired. The object can be placed in any orientation, as long as the object is contained in the field of view of the detector. This method has been defined using a geometric magnification of unity, but it does not preclude any other magnification from being used. In order to maximize image quality (IQ), a lead (or any other highly X-ray attenuating material) mask (not shown) may be used to cover the edges of the shims or wedge. This will effectively reduce the amount of undercutting around the edges of the object. A simple edge detection algorithm is utilized to find the boundaries and orientation of the object. Edges will be generated at the boundaries of the various thickness steps, intermediate step separations and other sources. A Hough transform is then used to map these edges to straight lines. Since the Hough transform generates duplicate lines, suitable distance criteria are used to identify those, which correspond to the bounds of the step wedge.

As shown in FIG. 6A, a center-line-path 68 down the middle of the step wedge can be overlaid and the gray scale as a function of position on the center-line 68 determined. The boundaries of the step wedge, as defined by the previous operations allow us to automatically extract this relationship. In order to reduce any edge effects, the gray scale (GS) value of the pixels at the middle ¼ of the step can be averaged. The variance of the detector pixel values over this region can be used to assign an uncertainty to each value. Note the chosen geometry of the central region of each step corresponds to about 25% of the inner area as illustrated by the squares 601 overlaid on the gray scale pattern. This keeps edge effects to a minimum and maintains a good estimate of the gray scale on each step.

Once the longer boundaries of the step wedge are identified, the center-line-path 68 is calculated down the length of the image at the mid-point of the width dimension and overlaid on the image. The pixel values along the line 68 are then extracted and put into a functional representation giving the pixel value versus pixel number. Using a line path down the center of the wedge allows us to exclude major effects of under-cutting and inter-element back-scatter from the detector at the edge or boundary of an object which can negatively impact the integrity of the correlation between measured gray scale and material thickness.

Figure 7A:
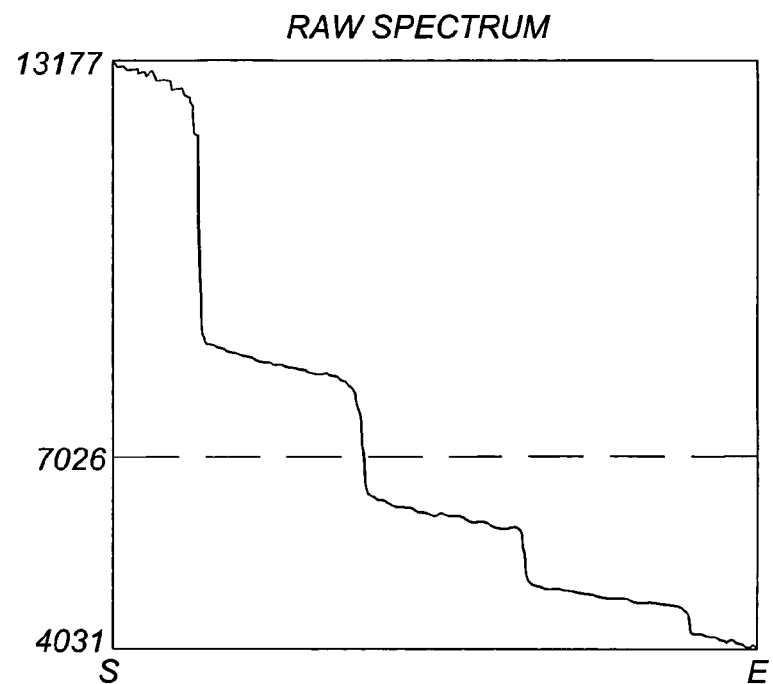
FIG. 7A is a graph illustrating the gray scale of the step wedge as a function of the position down the center line 68 of FIG. 6A.
Figure 7B:
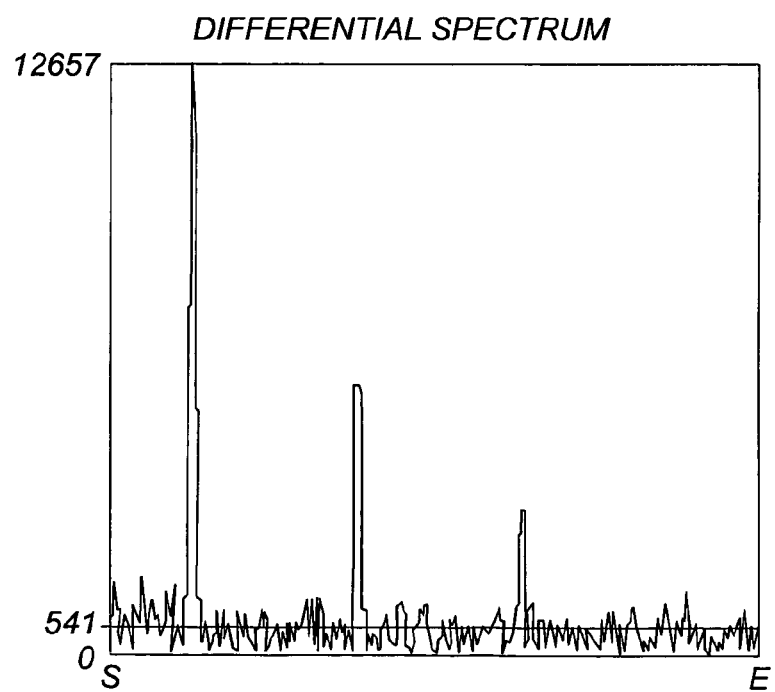
FIG. 7B is a graph illustrating the differential spectrum of FIG. 7A where the boundaries of the steps as seen in FIG. 6A are identified as peaks.

FIG. 7A is a graph illustrating the raw spectrum of the gray scale image, showing the steps in the gray scale pattern. The raw image is processed by a low pass filter in order to reduce the noise. In FIG. 7B, the data is differentiated in order to detect the step boundaries which can be identified by the strong peaks in the differential spectrum of FIG. 7B. The distance between successive peaks can be used to dimension the steps and define the orientation of the step wedge.

Figure 6B:
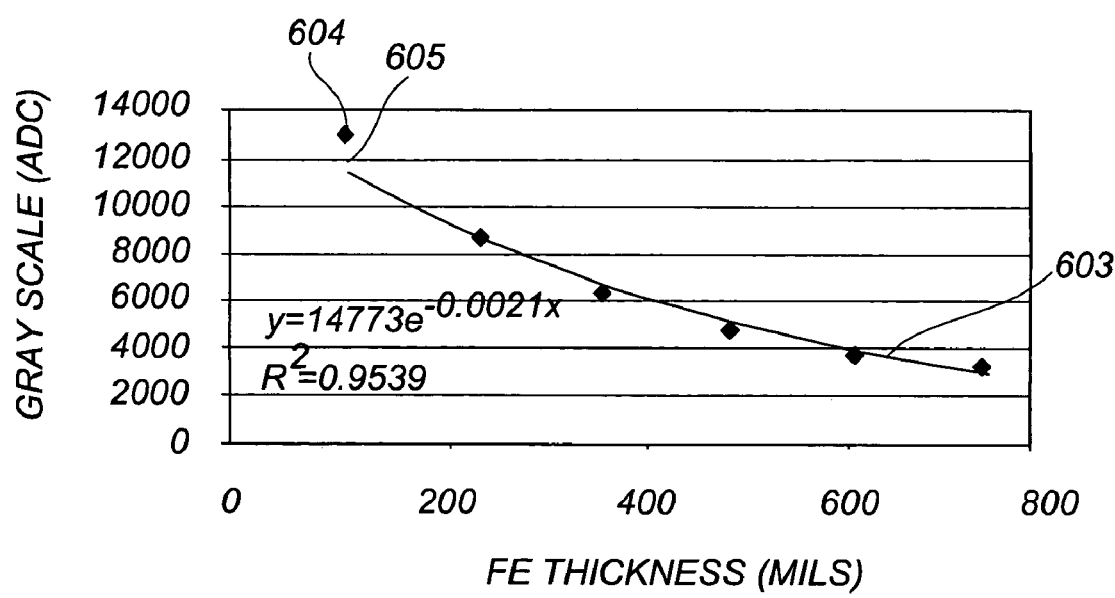
FIG. 6B is a graph illustrating the correlation of gray scale boundaries of FIG. 6A to material thickness parameterized as a single exponential.

Referring now to FIG. 6B, it is apparent that the correlation of gray scale to thickness shows an approximate exponential behavior. However, higher order effects, multiple interactions and scatter effects show that a single component exponential is a poor approximation over a large range of thicknesses as exemplified by the mismatch (605) at point 604. This is because the correlation of gray scale to thickness displays an increasing uncertainty with thickness. This is due to a higher fraction of scatter with respect to primary radiation, due to multiple interactions. To increase precision, a spline fit is used to interpolate the data. It is also used to generate a model for extrapolation beyond the data limits.

With the large dynamic range of the GE digital detectors, it has been found that we are easily able to acquire a usable signal over a range of ±½" on a 1-3 inch sample of steel. This allows us to utilize several different thicknesses. In an exemplary case, 8 different thickness samples, which differ in thickness by ⅛" were used. In order to deal with a case when less dynamic range is available, a Pb or other highly attenuating marker 602, which may be a Pb letter or any standard IQI with embossed digit, is used as a marker at the edge of a specified step or shim (usually the center step). An edge-line-path 69 is then calculated proximate an edge of the object, and the pixel values are extracted to produce a function of pixel value versus pixel number, as explained above. The function is differentiated and compared with the differentiated function down the mid-line of the step wedge. If no change is found, the edge-line-path is recalculated so it is moved closer to the centerline of the step wedge. This algorithm is applied iteratively until a difference, attributable to the presence of the Pb marker 602 is detected. Once the presence of the marker is detected, a positive identification of the step number can be made.

Now, given that the number of steps (i.e., discrete material thickness) and step dimensions are known, an area to sample the gray scale of each discrete thickness step can be defined. Several geometries have been used, however the best results have been obtained when the inner central 25% of the step area is utilized as shown in FIG. 6A. The mean pixel value of all the pixels in this area is determined as well as the standard deviation. The mean pixel value is then associated with the thickness of the step. This process is repeated for each step that is identified and an effective function 603 of gray scale versus step thickness is produced. Naively, one would expect this to follow a Beer's law exponential dependence, but as exemplified by the mismatch 605 at point 604, this is not the case owing to several reasons, including the presence of multiple interactions, scattering, finite spatial resolution, etc.

However, as mentioned above, to increase precision, the pixel value correlation with the material thickness along with the associated error can be used effectively to extract the thickness of an arbitrary thickness of the same material by utilizing a spline fit to interpolate (or extrapolate) the tabular data. It should be noted that we have also parameterized the data into a multi-component exponential curve in order to get a true functional representation with equal success. By utilizing the error on the data points to weight the data point in a fitting algorithm, such as least squares, or chi-square regression, a useful precision can be placed on the derived quantity, whether interpolated or extrapolated.

Note that utilizing this method, generalizations can be made to other shooting conditions, including exposure, energy, magnification, material thickness, etc. For instance, the radiation field falls off as $1/r^2$, so the gray scale/thickness can be calculated at any arbitrary distance by the following parameterization:

$$GS_1 = GS_o \left(\frac{r_o}{r_1}\right)^2$$

where $GS_o$ is the gray scale of a specific thickness of material at a reference distance $r_o$ where $r_o$ measures the distance between the source and detector (i.e., source-detector distance or SDD). $GS_1$ is the gray scale expected for the same thickness under the same shooting parameters but at a source detector spacing of $r_1$. Likewise the gray scale (or thickness) of an object can be scaled for the effective exposure of the radiograph. The gray scale can be scaled by a linear factor calculated from the ratio of the exposures. The exposure of a radiograph is given as a product of the tube current (I) and the exposure time (t), or, for an isotope, the source activity and the exposure time. For example, the gray scale is scaled as:

$$GS_1 = GS_0 \left(\frac{I_1 t_1}{I_o t_o}\right)$$

where the gray scale at exposure 1 can be derived given the gray scale and exposure of a reference radiograph.

A scaling can be deduced as a function of tube endpoint energy ($kV_p$), where the tube output varies in a fairly well defined functional value as $(kV_p)^n$, where n is a power between 2-3. However, experiments with several tubes found this scaling factor to be dependant on the specific tube, and for the desired precision, it is usually more accurate to measure the detector response at the specific voltage settings.

The automated method described above is advantageous in that it is applicable to a wide range of geometries of inspected objects, and is applicable to a wide variation of shooting parameters. The method is applicable for a wide range of thicknesses in the step wedge or shims that may be used. Importantly, the procedure does not depend on precise alignment of the step wedges or shims on the detector. Accordingly, the above method is robust and reduces operator variability. Moreover, the above method reduces the amount of time required to generate a thickness map reference look-up table as compared to manual methods.

Given this preliminary calibration procedure, an object with similar X-ray attenuation properties to the calibration object can be imaged and the material thickness extracted, assuming that the features are large compared to the spatial frequency where the modulation transfer function (MTF) drops to a modulation of approximately 20%. Specifically, this means features that have a slowly varying spatial extent or long wavelength variations in their spatial frequency. In order to image short wavelength objects, a correction to the spatial response of the detector must be made, as described below.

Those skilled in the art understand that all physical detectors have a finite frequency response. For X-ray detectors, this means that the amplitude of the response (i.e., the number of counts registered in a pixel) will depend not only on the thickness of material, but also on the spatial extent of the object. An object of a given thickness will have a different response in the detector if it covers a large detector area as compared to an object with identical thickness but covers only a fraction of a pixel. The effect of this phenomenon is that the contrast of the response is modulated due to the spatial response of the detector. Mathematically, the spatial frequency response of a detector can be quantified by the modulation transfer function (MTF). The MTF quantifies how well an imaging system responds to objects of varying spatial extent. Methods for determining the MTF have been described in the literature and are well known.

In the case of a perfect detector, the MTF would have a constant value independent of the spatial frequency. By convention, the MTF is normalized to a maximum value of 1 at 0 spatial frequency. However, real detectors have a finite spatial resolution and therefore the MTF will decrease with increasing spatial frequency. There are well known methods for determining the MTF of a detector, for example, as disclosed in U.S. Pat. No. 6,521,886, the disclosure of which is incorporated by reference herein. Broadly speaking, the MTF can be determined by imaging a sharp edge of highly opaque material. From such an image, the average pixel response as a function of position, in a direction perpendicular to the edge can be extracted. This function is called the edge spread function (ESF). In the ideal case this would be a step function with an infinite slope at the transition point. Differentiating the ESF will give a function, which is called the line spread function (LSF). Again, in the ideal case, the LSF would be a delta function with zero width. In the case of a real physical detector, the LSF will have a finite width. The narrower the width of this function, the larger the MTF will be. Taking the Fourier transform of the LSF results in a frequency decomposition of the LSF. In the case of a delta function, all spatial frequencies are equally populated or weighted. If a finite width is measured in the LSF, as will be the case for any real detector, this is an indication that the high frequency spatial components are attenuated. As such the MTF function will begin to decrease as the spatial frequency is increased.

Figure 8:
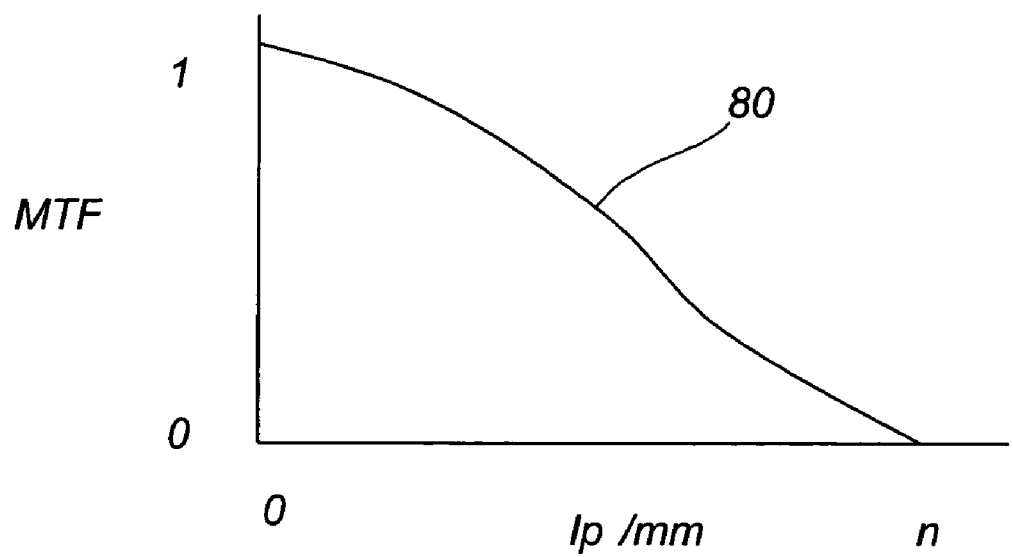
FIG. 8 is a graph illustrating a typical modulation transfer function (MTF) curve as a function of spatial frequency, here in line pairs per millimeter (lp/mm).

The shape of a typical MTF curve is shown in FIG. 8. The MTF curve 80 is normalized to unity at zero spatial frequency and gradually decreases as frequency is increased, until at some point the modulation becomes zero and remains so for all higher frequencies. A MTF value of unity indicates that the average contrast for a given spatial frequency is perfectly maintained, while zero MTF shows that the object was completely lost, or not "seen" in the imaging process. Generally, the higher the MTF, the better the preservation of detail by the imaging system. The MTF partially describes the spatial resolution capabilities of a detector, but not the sensitivity, nor probability of detection properties.

Although the MTF is dominantly defined by the detector properties themselves, there is also a dependence on the size and shape of the source, as well as the relative geometrical layout of the source, detector, and object being imaged. In the above mentioned case, the spatial frequency response manifests itself in producing a different contrast level between features that have different sizes or spatial frequencies. This is a very important aspect in detection of small features such as pits and micro-deposits, which are critical to dimension accurately when assessing fitness for service of an asset. Without taking the varying MTF into account, an underestimate will be made in dimensioning and depth profiling small features.

The spatial frequencies present in an image can be determined by calculating the 2-d Fourier transform (FT) of the image. The relative amplitude of each spatial frequency component is a measure of the content in the image. Each amplitude of the image FT can be scaled by the inverse value of the MTF to appropriately weight the image component. This has the effect of "magnifying" the features in the image with a value proportional to the measured detector response (i.e. MTF). This will have the effect of increasing the amplitude of small spatial frequencies (i.e., small features) while leaving slowly varying features (i.e., large features) largely unaffected. Once the scaling is made, the inverse FT is applied to the image, with results being a radiographic image corrected for the spatial frequency response of the detector. In order to limit the amplification of unimportant noise and artifacts, which are associated with high frequency spatial components, the MTF scaling is not applied to portions of the image which fall beyond the Nyquist frequency of the detector. In order to further suppress the amplification of noise, an elementary low-pass filtering algorithm can be applied to damp high frequency oscillations and prevent a large scale amplification of the noise. An important aspect of this procedure is that knowledge about the size or character of the imaged feature/defect is not required before this procedure is carried out.

Figure 9:
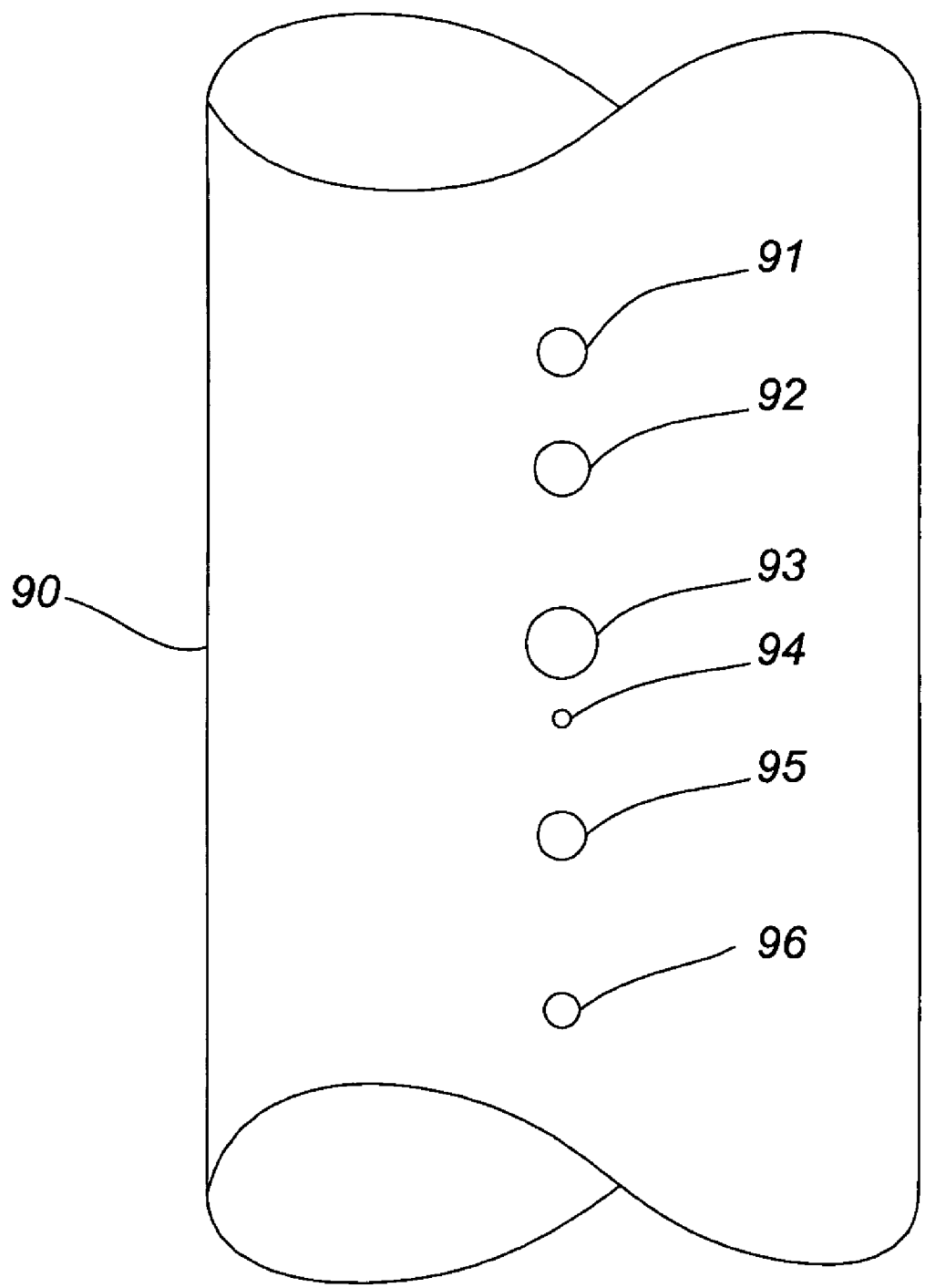
FIG. 9 is a front view of a sample fluid vessel with a series of holes used to demonstrate an imaging capability of an embodiment of the invention.
Figure 10:
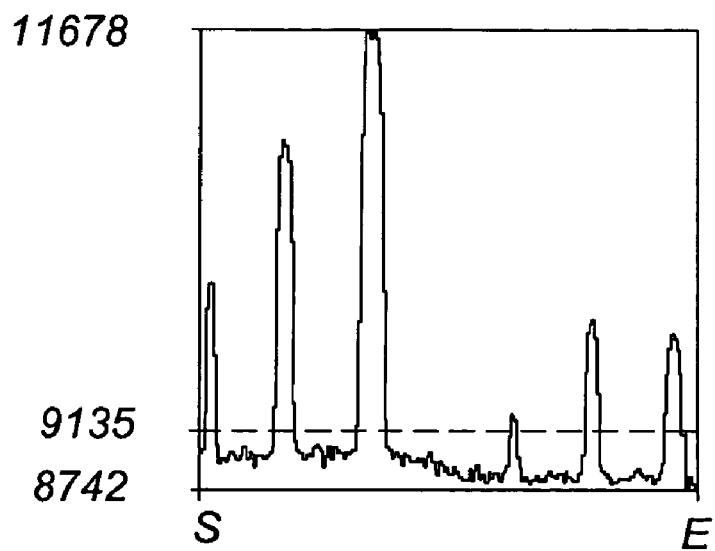
FIG. 10 is a graph illustrating a gray value distribution across the series of holes of FIG. 9 without MTF correction.
Figure 11:
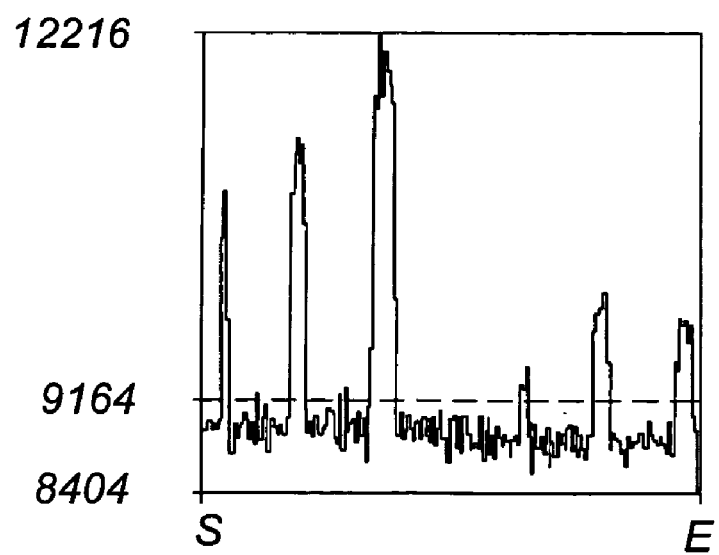
FIG. 11 is a graph illustrating a gray value distribution across the series of holes of FIG. 9 with MTF correction.

Referring now to FIG. 9, there is illustrated an exemplary pipeline structure 90 having a series of holes 91-96 for demonstrating an imaging capability of the present invention. Results of the imaging procedure are shown in FIG. 10, wherein a graphical response representing the gray value distribution across the holes 91-96 without MTF correction is displayed. By comparison, FIG. 11 illustrates the same gray value distribution, but the results are corrected with the MTF. The effect of MTF correction produces a more accurate quantification of the feature depth by as much as a factor of 10. The peak response across the holes 91-96 is higher after MTF correction. Actual depth measurements before and after MTF correction are summarized in Table 1 below. As can be seen, the error in the feature size decreases dramatically after the application of the MTF correction.

TABLE 1

Holes actual depths are compared with the depth measured before and after MTF correction.

| DXR500 | Diameter in mils | Actual Depth | Without MTF correction Depth in mils | % Error | With MTF correction Depth in mils | % Error |
|---|---|---|---|---|---|---|
| Hole 1 | 20 | 80 ± 8 | 43 | 46.25 | 60 | 25 |
| Hole 2 | 40 | 80 ± 8 | 63 | 21.25 | 82 | −2.5 |
| Hole 3 | 80 | 80 ± 8 | 80 | 0 | 89 | −11.25 |
| Hole 4 | 20 | 40 ± 4 | 14 | 65 | 20 | 50 |
| Hole 5 | 40 | 40 ± 4 | 33 | 17.5 | 46 | −15 |
| Hole 6 | 80 | 40 ± 4 | 32 | 20 | 42 | −5 |

A further complication in producing an accurate thickness map is to correct for the tubular geometry of a pipe or vessel. Since a radiograph projects the total integral path of material onto the detector, one must account for the geometrical shape of the pipe or vessel when extracting the total wall thickness. In other words, a cross sectional slice across the diameter of the pipe will not result in a constant path length of material defined by the various chords drawn from the source to the detector. The minimum amount of pipe material will exist in the center of the detector. As the chord is shortened, the total amount of material will increase. In order to quantify this effect, a nominal profile of the nominal path integral can be calculated using the known geometry and relative positions of the source, detector and object being imaged.

Figure 12:
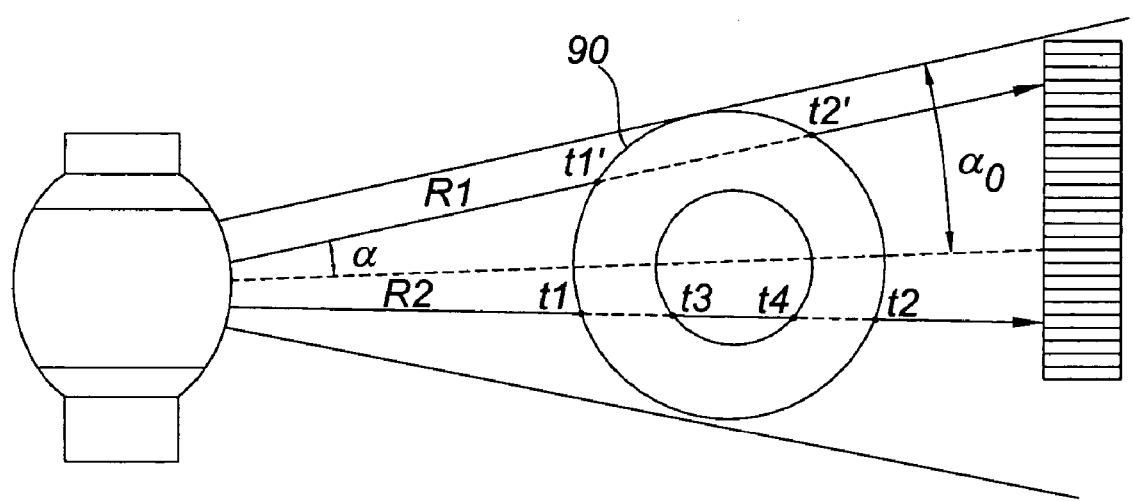
FIG. 12 is a sketch illustrating ray interactions with a tubular pipe geometry.

As shown in FIG. 12, a geometric representation of exemplary source trajectory rays R1 and R2 can be used to illustrate a method for estimating the wall thickness of a tubular pipeline structure 90. It is relatively simple to compute a path length of material defined by Rays 1 or 2 using known geometry. The ray angle $\alpha$ for each pixel within the X-ray cone beam will be calculated and the corresponding ray interactions with the pipe geometry can be evaluated. For a ray that intersects both the cylinders as shown in R2, the thickness can be calculated as: Thickness=(t3−t1)+(t2−t4). If the ray intersects only one cylinder (OD), the thickness can be calculated as: Thickness=(t2'−t1'). The path length calculated is a function of the incident angel $\alpha$ of the X-ray. The path length is minimum for $\alpha=0$, and increases non-linearly, reaching a maximum, and then falling to zero as the angle $\alpha$ goes from zero to the maximum angle $\alpha_0$.

At the extreme, the material path integral can be calculated for every individual detector element or pixel. In order to increase the calculational speed, a group of pixels may be approximated as a single pixel. The size of the group will be determined by the degree of precision that is required in the measurement. It is important that the beam path calculation be calculated with the appropriate alignment parameters. Once the beam path is determined, it can be compared with the measurement to estimate the degree of wall loss.

Fluid-filled pipes provide perhaps the most rigorous challenge for extracting absolute wall thickness estimates. To illustrate the most elementary case, it is assumed that the composition of the fluid is known. Given this information, the mean thickness of a single wall can be extracted from a single radiograph measurement if the radiographic thickness of the fluid is known in terms of the pipe or vessel material. In fact, this method can be generalized to multiple layers if the radiographic equivalence thickness of each material is known. This determination can be done in several ways. For example, a Monte Carlo simulation can determine radiographic equivalent thicknesses of materials by calculating the material thickness which equalizes dose rates of transmitted X-ray spectra with the pipe/vessel material and the fluid. This is a straightforward procedure for a mono-energetic radiation source. Care must be taken in using a spectral source, such as X-ray tubes where the beam hardening effects are not trivial. Again one must do the calculations to have the appropriate weighting for the energy dependant absorption terms. The calculations must equalize the radiation doses in the same geometry that they occur in the system to be inspected, otherwise, the differential absorption asymmetries will become a significant source of error. This can also be done experimentally by separately measuring thicknesses of material that represent the pipe wall, pipe contents, as well as pipe insulation if necessary.

The following equations are written to describe expressions for extracting absolute wall thickness estimates from insulated fluid-filled pipes:

$$\text{Equation } X = X_{fe} + X_{fe,water} + X_{fe,insulation} \quad (1)$$

$$\text{Equation } X_{total} = X_{fe} + X_{water} + X_{insulation} \quad (2)$$

$$\text{Equation } \mu_{Fe}*X = \mu_{insulation,FW}*X_{insulation,FW} + \mu_{Fe,FW}*X_{water} + \mu_{Fe,BW}*X_{insulation,BW} \quad (3)$$

Where:
X=Fe equivalent thickness
$X_{fe}$=Fe thickness
$X_{fe,water}$=Fe equivalent thickness of water $X_{fe,insulation}$=Fe equivalent thickness of insulation
$X_{total}$=Total Beam Path Thickness
$X_{water}$=Water thickness
$X_{insulation}$=Insulation thickness
$\mu_{fe}$=Attenuation Coefficient of insulation
$\mu_{insulation}$=Attenuation Coefficient of insulation
$\mu_{water}$=Attenuation coefficient of water By assuming that:

$X_{insulation,FW} = X_{insulation,BW}$
$\mu_{Fe,FW} = \mu_{Fe,BW}$
$\mu_{insulation,FW} = \mu_{insulation,BW}$
$X_{Fe,FW} = X_{Fe,BW}$ and through substitution, Equation (3) becomes:

$$\mu_{Fe} * X = /\mu_{Fe} * X_{Fe} + \mu_{water} * X_{water} + \mu_{insulation} * X_{insulation} \qquad (3')$$

The above equations can then be solved for
$X_{Fe}$, $X_{water}$, and $X_{insulation}$ Improvements in accuracy after fluid and insulation correction are summarized in Table 2 below:

TABLE 2

Improvement in accuracy after correction

| Step | Actual Thickness | Predicted thickness without correction for water (mils) | Uncorrected Error (%) | Predicted thickness with correction for water (mils) | Corrected Error (%) |
|---|---|---|---|---|---|
| 2 | 434.4 | 754.9 | −73.8 | 401.3 | 7.6 |
| 3 | 456.8 | 783.8 | −71.6 | 432.4 | 5.3 |
| 4 | 466.0 | 782.6 | −67.9 | 435.1 | 6.6 |
| 5 | 470.4 | 784.6 | −66.8 | 435.0 | 7.5 |
| 6 | 476.8 | 792.4 | −66.2 | 444.2 | 6.8 |

These measurements must be done at the energy settings to ensure the spectral effects are properly handled. Once the measurements are made, they must be normalized to the same exposure. A ratio of the digital data from the detector will give the relative radiographic density factor. Once this is done the fluid-filled pipe can be imaged. With the constraint of the pipe outside geometry, and folding in the relative radiographic density of the fluid with respect to the pipe, the measurement can be used to extract the mean pipe wall thickness. This method was validated with point ultrasound (UT) measurements, and the discrepancy between the two methods, over the entire image, is less than 12%.

Once the radiographic effective thickness and the nominal dimensions of the pipe/vessel are known, the problem is reduced to a single equation and a single unknown. Since the value of the transmitted spectrum is measured, using the constraint of the nominal pipe/vessel geometry produces a value for the wall thickness of the vessel.

While the disclosure has been illustrated and described in typical exemplary embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claimed is:

1. A method for generating a wall thickness map of an object by converting digital data representing a digital radiographic image into a display map representing the absolute thickness of the object, said method comprising the steps of:
    a. providing an X-ray or gamma ray radiation source for directing radiation through a region of said object;
    b. providing a radiation detector having a plurality of sensing elements for detecting said radiation;
    c. acquiring a flat field image to equalize a response from each said sensing element;
    d. recording numerical data indicative of an intensity of said radiation incident on each said sensing element;
    e. correlating said numerical data to a measurement of the thickness of said object;
    f. calibrating said numerical data, comprising the steps of:
        i. correcting for variations in a source-detector-distance (SDD) between said source and said detector by correcting the flux of X-rays or gamma rays to account for scattering;
        ii. correcting for variations in a source-object-distance (SOD) between said source and said object by correcting the flux of X-rays or gamma rays to account for scattering;
        iii. correcting for variations in a spatial frequency response (MTF) of said detector to determine the spatial extent and penetration depth of features within the object; and
        iv. correcting for variations in a geometric profile defining said object; and
    g. generating an absolute thickness map for a region of said object from said calibrated data.

2. The method of claim 1, wherein said calibrating step (f) further comprises the step of correcting for material contained within said object.

3. The method of claim 2, wherein said calibrating step (f) further comprises the step of correcting for material attached to an outside surface of said object.

4. The method of claim 3, wherein said object is a pipeline and said thickness is a wall thickness of said pipeline.

5. The method of claim 1, wherein said calibrating step (f) further comprises the step of correcting for variations in EM scattering of said radiation.

6. The method of claim 1, wherein said detector is a linear array detector.

7. The method of claim 6, wherein said detector is a flat panel digital detector.

8. A system for generating a wall thickness map of an object by converting digital data representing digital radiographic images into a display map representing the absolute thickness of a region of the object, the system comprising:
    a. a radiation source for directing X-ray or gamma ray radiation through a region of an object;
    b. a radiation detector having a plurality of sensing elements for detecting said radiation;
    c. means for acquiring a flat field image to equalize a response from each said sensing element;
    d. means for recording numerical data indicative of an intensity of said radiation incident on each said sensing element;
    e. means for correlating said numerical data to a measurement of the thickness of said object;
    f. means for calibrating said numerical data, comprising:
        i. means for correcting for variations in a source-detector-distance (SDD) between said source and said detector;
        ii. means for correcting for variations in a source-object-distance (SOD) between said source and said object;
        iii. means for correcting for variations in a spatial frequency response (MTF) of said detector;

iv. means for correcting for variations in a geometric profile defining said object; and g. means for generating a map representing an absolute thickness of the region of the object from said calibrated data.

9. The imaging system of claim 8, wherein said means for calibrating further comprises means for correcting for variations in EM scattering of said radiation.

10. The imaging system of claim 9, wherein said means for calibrating further comprises means for correcting for material contained within said object.

11. The imaging system of claim 10, wherein said means for calibrating further comprises means for correcting for material attached to an outside surface of said object.

12. The imaging system of claim 11, wherein said object is a pipeline, and said measurable parameter is a wall thickness of said pipeline.

13. A method for calibrating digital data and using the data to generate a thickness map of an object, comprising the steps of:

providing an X-ray gamma ray radiation source and radiation detector;

providing a calibration block having a plurality of thickness regions disposed along a length of said block;

acquiring a digital image with said radiation detector representing each of said thickness regions;

detecting the boundaries of each said thickness region;

sampling an inner area of said image at each said thickness region so as to generate a mean pixel value and an uncertainty representing each said thickness region;

mapping each said mean pixel value to a thickness dimension defining each said thickness region;

generating a look-up table to store results from said mapping step; and generating a thickness map using the look up table.

14. The method of claim 13, wherein said detecting step further comprises the steps of:

calculating a center-line-path proximate a mid-width of said image, said center-line-path being substantially parallel to a length of said image;

extracting pixel values from said image along said center-line-path to obtain a first reference distribution characterizing said thickness regions;

differentiating said first reference distribution to identify boundaries between each said thickness region; and determining the number of said thickness regions and the outer dimensions defining said thickness regions.

15. The method of claim 14, wherein said detecting step further comprises the steps of:

i. placing an attenuation marker proximate a midsection of one of said thickness regions;

ii. calculating an edge-line-path proximate an edge of said image, said edge-line-path being substantially parallel to said center-line-path;

iii. extracting pixel values from said image along said edge-line-path to obtain a second reference distribution characterizing said thickness regions;

iv. differentiating said second reference distribution;

v. comparing said first and second differentiated reference distributions to identify presence or non-presence of said attenuating marker in said second reference distribution;

vi. re-calculating said edge-line-path incrementally closer to said center-line-path if said comparing step (v) fails to identify presence of said attenuation marker; and vii. repeating steps (iii) through (vi) until said comparing step (v) identifies presence of said attenuation marker.

16. The method of claim 15, wherein said detecting step further comprises the use of edge filters and non-linear transforms.

17. The method of claim 16, wherein said non-linear transforms are Hough transforms.

18. The method of claim 17, wherein said sampling step further comprises the step of filtering said reference data with a high order non-linear filter.

19. The method of claim 18, further comprising the step of masking the outer edges of said block with radiation attenuating material to reduce the amount of radiation scatter and undercutting around said outer edges.

20. The method of claim 19 wherein said inner area comprises an inner central about 25% of the surface area of said thickness regions.

21. The method of claim 20, wherein said mapping step (e) further comprises the step of fitting said mean pixel values with a chi-square or least-squares fitting algorithm.

22. The method of claim 21, further comprising the step of scaling said digital data by a linear factor calculated from an exposure ratio.

23. The method of claim 22, further comprising the step of scaling said data as a function of the energy of said X-ray source or as a function of the detector response at predetermined voltage levels.

* * * * *

UNITED STATES PATENT AND TRADEMARK OFFICE
CERTIFICATE OF CORRECTION

PATENT NO. : 7,480,363 B2 Page 1 of 1
APPLICATION NO. : 11/108498
DATED : January 20, 2009
INVENTOR(S) : Brian W. Lasiuk et al.

It is certified that error appears in the above-identified patent and that said Letters Patent is hereby corrected as shown below:

Title Page, Item (75) Inventors, please correct Vamishi Krishna Reddy Kommareddy to --Vamshi Krishna Reddy Kommareddy--

Signed and Sealed this

Seventeenth Day of March, 2009

JOHN DOLL
*Acting Director of the United States Patent and Trademark Office*